J. ADAMS.
Hay Rake and Loader.
No. 78,912.  
Patented June 16, 1868.
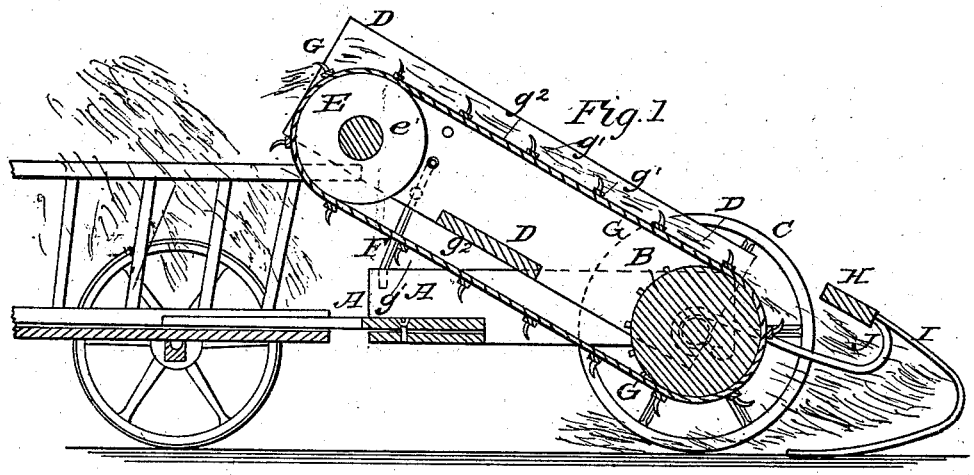
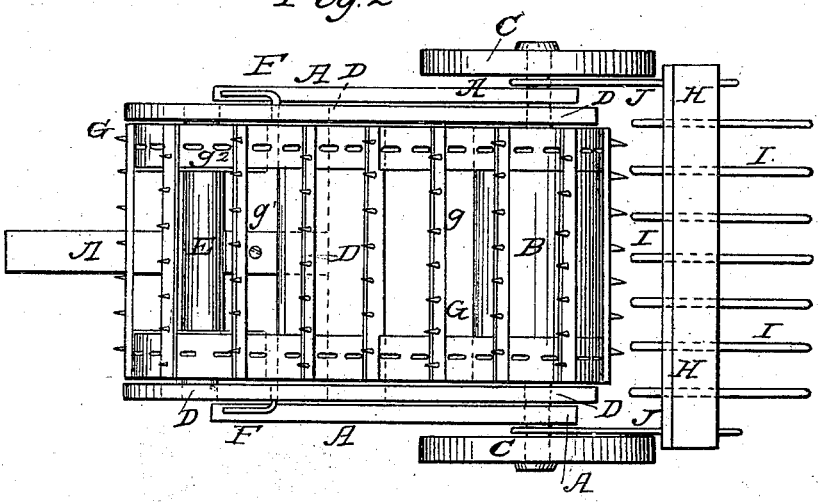
Witnesses  
W. C. Ashkettle  
A. Fraser
Inventor  
J. Adams.  
per Munn & Co  
Attorneys

UNITED STATES PATENT OFFICE.

JOHN ADAMS, OF TRANSFER, PENNSYLVANIA.

IMPROVEMENT IN HAY RAKER AND LOADER.

Specification forming part of Letters Patent No. 78,912, dated June 16, 1868.

*To all whom it may concern:*

Be it known that I, JOHN ADAMS, of Transfer, in the county of Mercer and State of Pennsylvania, have invented a new and Improved Machine for Raking and Loading Hay; and I do hereby declare that the following is a full, clear, and exact description thereof, which will enable others skilled in the art to make and use the same, reference being had to the accompanying drawings, forming part of this specification.

Figure 1 is a vertical longitudinal section of my improved machine. Fig. 2 is a top view of the same.

Similar letters of reference indicate corresponding parts.

My invention has for its object to furnish an improved machine for raking and loading hay, which shall be simple in construction, effective in operation, and may be easily attached to a wagon and adjusted to carry the hay to any desired height; and it consists in the construction and combination of the various parts, as hereinafter more fully described.

A is the frame of the machine, the forward end of which is securely attached to the rear part of the wagon upon which the hay is to be loaded. B is a roller, the journals of which revolve in bearings in the rear part of the frame A. C are the wheels, which are rigidly attached to the projecting ends of the journals of the roller B, so as to carry the said roller with them in their revolution.

D is the carrier-frame, the side rails of which are made broad, so that their upper edges may project above the carrier, and prevent the hay from working off at the sides of said carrier. The lower ends of the said bars or rails of the frame D ride upon the journals of the roller B, and their upper ends are connected by the roller E, which revolves in bearings in the said upper ends of the said side rails. The upper end of the frame D is adjustably supported by the hooked arms F, the lower ends of which are attached to the frame A, and the upper ends or hooks of which enter one or the other of the holes in the side rails of the frame D, according to the height to which it is desired to raise the hay.

G is the carrier, which is formed by attaching toothed bars $g^1$ to endless chains or belts $g^2$, which pass around the roller B and around the pulleys $e'$, formed upon or attached to the roller E, and to which motion is given by teeth or cogs formed upon or attached to the roller B, and which take hold of the said endless chains or belts, so that the carrier may be operated by the advance of the machine.

H I J is a rake. The cross-bar H, to which the wire teeth I are attached, is connected to the machine by the arms J, one end of which is attached to said cross-bar H, and their other ends hook and ride upon the journals of the roller B, as shown in the drawings. By this construction, as the hay is collected by the rake H I J it is caught by the hooked teeth of the cross-bars $g^1$ of the carrier G, carried up, and deposited upon the wagon, the said rake not only collecting the hay, but also holding it in such a position that the carrier G may readily take hold of it and carry it up to the wagon.

I claim as new and desire to secure by Letters Patent—

1. The rake constructed, as described, of the curved teeth I, attached at their upper ends to the head H, and the curved bars J, attached at their outer ends to said head, and adapted to turn freely upon the axle of the roller B by being hooked over the same, as herein shown and described.

2. The adjustable frame D, carrying the rollers and endless belt of hooks, when recessed at its lower end to rest upon the axle of the roller B, to which it is held by the tension of the endless belt G, as herein shown and described.

JOHN ADAMS.

Witnesses:
  ALVA MORRIS,
  S. M. McCLELLAND.